United States Patent Office 3,705,154
Patented Dec. 5, 1972

3,705,154
SYNTHESIS OF 4H-3,1-BENZOXAZIN-2(1H)-ONE
David Aelony and William James McKillip, Minneapolis, Minn., assignors to Ashland Oil, Inc., Columbus, Ohio
No Drawing. Filed July 8, 1971, Ser. No. 160,915
Int. Cl. C07d 87/20
U.S. Cl. 260—244 R    3 Claims

ABSTRACT OF THE DISCLOSURE

A method is disclosed for the preparation of 4H-3,1-benzoxazin-2(1H)-one wherein a trisubstituted ammonium-N-(2-hydroxymethylbenzoyl)imine is thermolytically rearranged to yield the contemplated product. The cyclic urethane obtained in accordance with the disclosed method is a monomer having usefulness in deriving copolymers with comonomers such as caprolactam, caprolactone, etc. and as a modifier for polyamide, polyurea and the like polymeric systems.

BACKGROUND OF THE INVENTION

Field of the invention

This invention relates to an improved method for preparing 4H-3,1-benzoxazin-2(1H)-one.

Description of the prior art

The prior art has proposed a method for the preparation of 4H-3,1-benzoxazin-2(1H)-one which can be aptly described by setting forth hereinbelow a reaction schematic showing the series of synthesis steps involved therein.

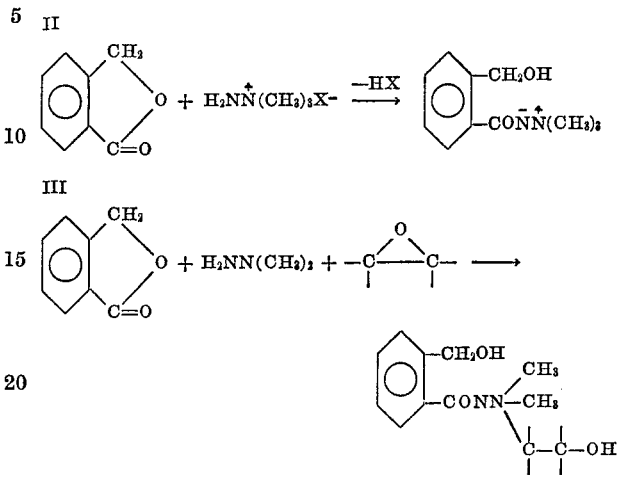

The principal disadvantage of this prior art method is the yield realized in the practice thereof. This disadvantage stems from the fact that the azide produced in the intermediate step is a very unstable compound which will begin to decompose at room temperature and will become extremely unstable at the moderately elevated temperatures utilized to effect cyclization.

SUMMARY OF THE INVENTION

In accordance with the present invention, a trisubstituted ammonium-N-(2-hydroxymethylbenzoyl)-imine is thermolytically rearranged to provide 4H-3,1-benzoxazin-2(1H)-one as shown in the following reaction schematic:

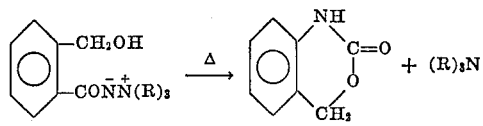

In deriving 4H-3,1-benzoxazin-2(1H)-one by the practice of this invention, preferred prior art procedures are availed of for obtaining the applicable trisubstituted ammonium - N - (2 - hydroxymethylbenzoyl)-imines. One procedure involves the rection of phthalide with a trialkylhydrazinium halide in the presence of a suitable dehydrohalogenating agent. The alternate procedure consists of reacting phthalide with an unsymmetrical dialkyl hydrazine and a lower alkylene oxide. For illustrative purposes, the aforesaid reactions are shown schematically below wherein any ultimate leaving group except that provided by an epoxide reactant is shown as methyl for convenience.

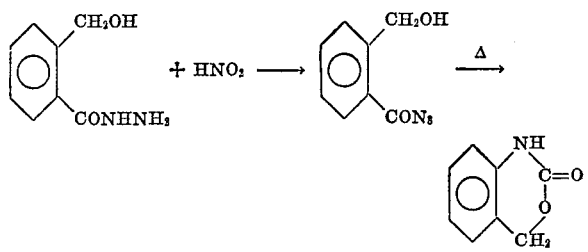

Besides the economies associated with the nature of the reactants employed in the process of this invention, a foremost advantage thereof resides in the fact that each of the underlying reactions can be accomplished in high yields.

DESCRIPTION OF THE PREFERRED EMBODIMENTS

The hydrazinium salts which can be reacted with the phthalide in accordance with the reaction mechanism identified as II above are preferably the tri-(lower)alkylhydrazinium chlorides. Since the alkyl substituents of such hydrazinium chlorides constitute the leaving group in the thermolysis reaction yielding the contemplated product, it is particularly preferred to employ trimethylhydrazinium chloride in the reaction with the phthalide. The hydrazinium salts can be readily obtained by the reaction of 1,1-dimethyl hydrazine with methyl chloride.

As indicated hereinabove, the reaction of the hydrazinium chlorides and phthalide is carried out in the presence of a strong base serving as a dehydrohalogenating agent. Suitable agents of this type include the strong inorganic and organo-metallic bases. Representative of the strong inorganic bases are the alkali metal hydroxides, specifically sodium and potassium hydroxides. Representative of the organo-metallic bases are the lower alkoxides of an alkali metal. Particularly preferred bases are the lower alkoxides of the alkali metals, for example, sodium and potassium methoxide, ethoxide and propoxide. The base is ordinarily added to the reaction mixture in an amount of about that equivalent to the hydrazinium salt present therein.

Since phthalide is an inner ester, the reaction thereof with the hydrazinium salt is a nucleophilic displacement type reaction. Accordingly, it is preferable to carry out this phase of the method in hydroxylic solvent. The preferred hydroxylic solvents are the lower alkanols such as methanol, ethanol and isopropanol.

In the reaction of the phthalide and the hydrazinium salt to provide the corresponding tertiary amine benzoylimide or aminimide, the reaction temperature is generally maintained in the range of between 0° and 80° C., and more preferably between about 50° and 80° C. The reaction is advantageously conducted at ambient pressures although superatmospheric pressures are applicable. In view of the nearly quantitative yields of the aminimide obtainable, it is preferable to use nearly equivalent amounts of phthalide and the hydrazinium salt. Further details relative to the foregoing procedure for deriving the aminimide can be found in U.S. Ser. No. 14,668, filed Feb. 26, 1970.

The other method applicable for deriving the trisubstituted ammonium -N-(2-hydroxymethylbenzoyl)-imine is shown in the reaction schematic identified as III hereinabove. This procedure consists of reacting phthalide with an unsymmetrical disubstituted hydrazine, preferably a dialkyl hydrazine, and a mono-epoxide. Since the epoxide becomes part of the leaving group in the thermolytic rearrangement of the aminimide, it is desirable to use for the instant purposes a lower alkylene oxide as the mono-epoxide reactant. Similarly, it is preferred to use an unsymmetrical disubstituted hydrazine having a lower alkyl, specifically methyl substituents. Further details concerning this method for deriving the aminimide can be found in U.S. Pat. No. 3,485,806.

Upon recovery of the aminimide from the reaction mixture obtained pursuant to either of the aforesaid methods, said intermediate is thermolytically rearranged to provide the 4H-3,1-benzoxazin-2(1H)-one. Rearrangement can be accomplished by simply heating the aminimide at a temperature in excess of about 140° C. for the length of time needed to achieve completion of the cyclization. The completion of the rearrangement can be noted by observing the disappearance of the aminimide IR absorption band at 1585 cm.$^{-1}$. Usually in the thermolytic rearrangement of an aminimide, the corresponding isocyanate is obtained. Normally in effecting this type of rearrangement, the reaction is carried out in a refluxing solution of the aminimide in an inert organic solvent having a boiling point in excess of about 140° C. The main advantage in carrying out the rearrangement in a solvent solution of the aminimide is that this technique facilitates the removal of the tertiary amine generated during thermolysis. In the practice of the present invention, however, the presence of a solvent or rather the amount thereof present has a marked influence upon the yield of the cyclic urethane. In other words, the more dilute the solution, the better the yield. It has been noted that a gravimetric ratio of solvent to the aminimide of about 22:1 will provide a yield of the cyclic urethane in the order of about 35%. The yield will increase to about 80% upon employing a gravimetric ratio of solvent to the aminimide in the order of 175. Accordingly the preferred operating range of solvent to aminimide on the aforesaid basis is from about 40 to 350. It is to be appreciated, however, that the yields referred to are in terms of the desired product and that overall yields, i.e., recovery of the starting materials plus product usually approach theoretical. As mentioned hereinabove, any inert organic solvent having a boiling point of at least about 140° C. can be used in the practice of the preferred embodiments of the invention. Representative of such solvents are xylene, mesitylene, diethylbenzene, cumene and methyl cumenes.

In order to illustrate to those skilled in the art the best mode contemplated for carrying out the present invention, the following working examples are set forth. As indicated, these examples are presented primarily by way of illustration and accordingly, any enumeration of details contained therein should not be construed as a limitation on the invention except to the extent expressed in the appended claims. All parts and percentages given are on a weight basis unless otherwise indicated.

EXAMPLE I

This example illustrates the preparation of trimethylammonium-N-(2-hydroxymethylbenzoyl)-imine.

Into a suitable reaction vessel equipped with a stirrer and reflux condenser was added a mixture of 960 ml. isopropanol and 40 ml. methanol and the mixture brought to 50° C. Sodium in the amount of 23 g. was dissolved in the solvent mixture whereupon 110.5 g. trimethylhydrazinium chloride were added followed by the addition of 134 g. phthalide. The mixture was agitated for 6½ hours at 55° C. and allowed to stand overnight. The product was filtered and the salt cake washed with isopropanol. The combined filtrates were evaporated in vacuo on a rotary evaporator and extracted with boiling acetone. The extract was cooled to 0° C. and filtered. Fractions were obtained by evaporation, cooling to 0° C., filtration and drying of the precipitates in vacuo. The following fractions were obtained: (1) 65.1 g.; M.P. 126–7° C., (2) 91.2 g.; M.P. 124–5° C., (3) 18.7 g.; M.P. 125–7° C., (4) 12.6 g.; M.P. 112–126° C., (5) 4.6 g.; M.P. 107–26° C. and a liquid residue of 7.9 g. Fraction (1) exhibited the following elementary analysis: 62.3% C., 7.71% H, 13.48% N; Required for $C_{11}H_{16}N_2O_2$: 63.46% C, 7.69% H, 13.46% N. Total recovery was 97%; yield of aminimide based on the first four fractions was 90.2%.

EXAMPLE II

This and the remaining examples illustrate a generalized procedure for effecting the thermolytic rearrangement of the aminimide described in Example I to produce 4H-3,1-benzoxazin-2(1H)-one.

Four liters of distilled mesitylene was refluxed and agitated over a Stark-Dean tube for 30 minutes and then cooled to 140° C. Twenty grams of the aminimide of Example I were added and the solution refluxed for 2 hours. Samples in the amount of 50 ml. were taken after 30, 60 and 90 minutes. These examples were evaporated in vacuo and subjected to infrared analysis. The 30 minute sample showed no aminimide peak at 1585 cm.$^{-1}$ indicating that in this length of time the thermolysis reaction had become substantially complete. The reaction mixture was filtered and evaporated in vacuo on a rotary evaporator. The residue from the three samples were dissolved in 150 ml. boiling benzene, cooled to 5° C., filtered and dried in vacuo at 100° C. The first crop of crystalline product weighed 10.4 g. and exhibited a melting point of 118.5° C. The mother liquor was evaporated to 30 ml., cooled to 5° C., filtered and dried. The second crop of crystalline product weighed 1.1 g.; M.P. 112–115° C. The second mother liquor was evaporated yielding 2.8 of liquid residue. Total yield was theoretical. Yield of the cyclic urethane product was 80.4%.

EXAMPLE III

Distilled mesitylene in the amount of 500 ml. was refluxed 30 minutes over a Stark-Dean tube, cooled to 140° C. whereupon 20 g. of trimethylammonium - N - (2-hydroxymethylbenzoyl)-imine were added and the solution then refluxed and agitated for 2 hours. The product was filtered and the filtrate evaporated whereupon the residue was dissolved in 100 ml. benzene. The benzene solution was cooled to 5° C., filtered and dried. The first fraction weighed 4.7 g. and exhibited a melting point of 118° C. The mother liquor was evaporated to dryness, providing an 8.8 g. of liquid residue. Total yield was 94.4%. The yield of the cyclic urethane was 32.9%.

EXAMPLE IV

Mesitylene in the amount of 2500 ml. was refluxed over a Stark-Dean tube and cooled to 140° C. Ten grams of trimethylammonium-N-(2-hydroxymethylbenzoyl)-imine were added and the solution refluxed for 40 minutes. The solution was cooled to 140° C. and a further 10 g. portion of the aminimide was added and the resultant solution refluxed for 40 minutes. The solution was cooled again to 140° C. and a third portion of the aminimide (10 g.) was added and the solution refluxed for 40 minutes. The product was filtered and worked up as described in the previous examples. Total yield was 96%. The crystalline product fractions were: (1) 15.4 g.; M.P. 117.7–118.5° C., and (2) 1.0 g.; M.P. 102–11° C. Yield of the crystalline product was 56%.

EXAMPLE V

Two liters of diethylbenzene were refluxed over a Stark-Dean tube for 30 minutes at 183° C. and then cooled to 140° C. Twenty grams of the aminimide of Example I were added, the solution then refluxed one hour and thereupon filtered, evaporated in vacuo and recrystallized from benzene as described in the previous examples. Yield of the cyclic urethane was 69.2%. Total yield by this method was 104%; the excess over theoretical being attributed to the difficulty experienced in distilling the last traces of diethylbenzene out of the residue.

What is claimed is:

1. A method for the preparation of 4H-3,1-benzoxazin-2(1H)-one which comprises heating at reflux temperature a solution in an inert organic solvent having a boiling point of at least about 140° C. of an aminimide corresponding to the formula:

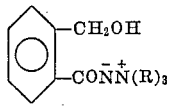

wherein R is a lower alkyl or hydroxy alkyl group.

2. A method in accordance with claim 1 wherein the thermolytic rearrangement of the aminimide is carried out in said solution thereof in which the gravimetric ratio of solvent to aminimide is between about 40 and 350.

3. A method in accordance with claim 2 wherein said solvent is mesitylene.

References Cited
UNITED STATES PATENTS
3,526,621    9/1970    Bernardi et al. _____ 260—244

HARRY I. MOATZ, Primary Examiner

U.S. Cl. X.R.

260—559 H, 349